July 1, 1969     W. C. MORRISON     3,452,975
CLAMPING DEVICES
Filed May 5, 1966
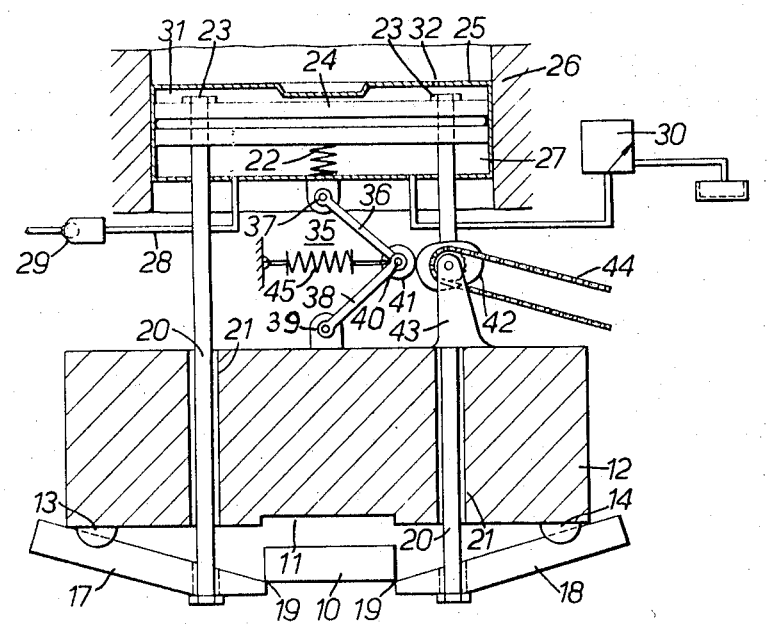
INVENTOR
WILLIAM CRAIG MORRISON
BY
Pierre, Scheffler & Parker
ATTORNEY

3,452,975
CLAMPING DEVICES
William Craig Morrison, Bishopbriggs, Glasgow, Scotland, assignor to G.B. Tools and Components Exports Limited, Wembley, Middlesex, England
Filed May 5, 1966, Ser. No. 547,936
Claims priority, application Great Britain, May 10, 1965, 19,657/65
Int. Cl. B25b 1/00, 1/14; B23q 3/08
U.S. Cl. 269—20       5 Claims

ABSTRACT OF THE DISCLOSURE

A clamping device consisting of first and second clamping members between which the work is clamped. The first clamping member is attached to one and of a piston rod and a piston is secured at the other end thereof. The piston is slidably mounted in a cylinder and a constant fluid pressure is maintained therebetween. A drive mechanism first moves the piston and cylinder as a unit to initially clamp the workpiece and upon further actuation of the drive mechanism additional movement is imparted to the cylinder alone to a final position and produces a constant clamping pressure on the workpiece.

---

This invention relates to clamping devices for example for holding workpieces in an automatic manner while they are subjected to a machining operation. For example the machining operation may be broaching and the clamping device according to the present invention is of particular application in a broaching machine.

According to the present invention a clamping device comprises first and second clamping members arranged for guided movement relatively to one another by means of a piston rod secured to or engaging the first member and also connected to a piston mounted in a cylinder, the piston and cylinder being movable, firstly together relatively to the second member to produce a certain range of said guided movement and secondly relatively to one another to produce further guided movement in the same direction.

The second member, which may for example comprise a work bed or block, is preferably stationary, and mechanism, for example a cam and cam follower device, is provided for moving the cylinder towards or away from the second member at will.

The piston is preferably normally biassed towards the end of the cylinder remote from the second member and the biassing means may comprise a spring but in a particular application a fluid pressure line is also connected to the other end of the cylinder to enable fluid to be supplied under pressure to bias the piston in the cylinder in a direction away from the second member. Thus valves may be provided in the supply line which are so arranged as to maintain a substantially constant pressure in the cylinder irrespective of the relative positions of the piston and cylinder.

The device may include one or more further piston rods extending between the same piston and the first member or similar members. The first member or these similar members conveniently comprise clamping elements pivoted to the second member and which are adapted to engage only peripheral parts of the workpiece in order not to obstruct the machining operation.

It is found that the clamping device according to the present invention is particularly applicable for the clamping of workpiece during broaching operations at high speed. Since this speed is increasing with new techniques it is clear that the clamping mechanisms associated with such broaching machines must also match this increased rate of broaching. For example it is anticipated that a workpiece which has in the past taken three seconds to be broached can now be broached in a fraction of a second provided the automatic clamping mechanism is capable of matching the increased rate of broach and can handle, in the required time, the location, the clamping of the workpiece, and also the releasing of the workpiece so that it can be replaced immediately by a further workpiece for a similar machining operation.

It is also envisaged that, with the clamping device according to the present invention, a number of workpieces can be clamped end to end so increasing the output of the broaching machine to up to at least ten times the number of workpieces which can be machined or broached with previous arrangements in which each workpiece is clamped and machined individually.

The invention may be carried into practice in a number of ways but one specific embodiment will now be described by way of example with reference to the accompanying drawing the single view of which illustrates in a vertical and partial sectional view a device for clamping workpieces during machining operations thereon.

The device shown in the drawing illustrates a workpiece 10 which is arranged to be clamped within a recess 11 in a stationary block 12. For this purpose the block 12 has pivoted to it at points 13 and 14 respectively a pair of clamping levers 17 and 18, tips 19 of which are adapted as shown to engage the under surface of the workpiece and to carry it upwardly in a manner to be descrbed to a clamping position within the recess 11 in the stationary block 12.

In order to produce the upward movement of the clamping levers 17 and 18 each of these has associated with it a piston rod 20 extending through bores 21 in the stationary block 12, the upper ends 23 of the piston rods being secured to a piston 24 which is mounted within a cylinder 25. The piston is biased towards the top of the cylinder by a spring 22. As will be described the cylinder 25 is capable of movement with respect to the stationary block 12 in a direction parallel to the length of the piston rods 20 and for this purpose the cylinder 25 is mounted in either separate guides or an appropriate annular guide 26. The space 27 within the cylinder 25 below the piston 24 communicates with a supply line 28 for fluid which contains a valve 29 by which a constant pressure can be maintained within the space 27. The space 27 is also in communication with a pressure relief valve 30 which is set at a pressure above that of the pressure of the supply fluid. The relief valve is adjustable, and whilst the fluid pressure is constant for any one size of workpiece this can be increased or decreased as desired for other workpieces.

The space 31 above the piston 24 is in communication with atmosphere through an orifice 32 in the top of the cylinder.

In order to raise and lower the cylinder 25 in its guide 26 a toggle mechanism 35 is provided which comprises an arm 36 pivoted at 37 to the underside of the cylinder and a further arm 38 pivoted at 39 to the upper side of the stationary block 12. The other two ends of the arms 36 and 38 are pivotally connected at 40 and this pivot structure carries a cam follower 41 adapted to be engaged by a cam 42 pivotally supported on a lug 43 mounted on the top of the stationary block 12. The cam 42 is arranged to be driven by chain drive 44 so that in operation, when it is desired to clamp the workpiece 10 within its recess 11, the cam 42 is rotated to move the cam follower 41 to the left in the drawing, against the action of a return compression spring 45, to straighten the toggle linkage and thereby to lift the cyilnder 25. By virtue of the spring 22, and the fluid pressure within the space 27 in the cylinder 25, the piston 24 will rise together with the cylinder 25 and so lift the piston rods 20, the clamping arms 17 and 18, and hence the workpiece 10. During this initial part of the guided movement of the workpiece the piston will be engaging the upper side of the cylinder and accordingly the pressure applied to the workpiece is only slight.

During this initial guiding movement, the piston and cylinder rise together until the workpiece 10 contacts the recess 11 in the stationary clamping member, i.e. block 12 at which time piston rods 20 and hence piston 24 are stopped. Continued movement of the two arms 36, 38 of the toggle mechanism in the direction tending to straighten them out, accompanied by a compression of the restoring spring 45, causes cylinder 25 to continue its movement but now relative to the stopped piston 24 until the toggle arms 36, 38 reach their terminal position which is at top dead centre. The fluid pressure within the cylinder space 27 which is maintained constant by virtue of the valves 29 and 30 now assures that a constant clamping pressure will be applied to the workpiece by the clamping members.

Once the required machining operation on the workpiece 10 has been completed the cam 42 can be rotated to the position shown in the drawing whereupon the toggle mechanism 35 is returned to the position shown by means of its return spring 45 to lower the cylinder and piston. It will be appreciated that the cam in some circumstances could operate the cylinder direct without the use of the toggle mechanism but in most instances a toggle mechanism is incorporated to secure a mechanical advantage, for example of 10 to 1 so as to reduce the load on the cam for example to a 1000 lbs. where a clamping load may be 10,000 lbs.

The particular sizes of the various parts of the devices described above can of course vary depending upon requirements. Moreover the clamping device may be arranged in a multiple way in order to clamp a number of workpieces which are arranged end to end so that for example a group of upwards of six workpieces can be clamped at the same time prior to machining them as a group.

It will be appreciated that the actuation of the device according to the invention is a mechanical operation which does not involve the use of hydraulic or pneumatic controls. Such controls are found to slow up operations due to the period wasted during building up the required pressure and exhausting that pressure when the stroke is completed.

With the arrangement according to the invention a hydraulic clamping is obtained by the use of a constant hydraulic pressure supply and the speed at which the operations can be carried out is essentially determined by mechanical considerations.

I claim:

1. A device for clamping a workpiece comprising first and second clamping members between which the workpiece is to be clamped, means for guiding movement of said first clamping member towards and away from said second clamping member including a cylinder mounted for guided movement longitudinally of its axis, a piston slidable in said cylinder and a piston rod secured to said piston and connected to said first clamping member for actuating the same, means for producing and maintaining a substantially constant fluid pressure within said cylinder and which is transmitted to said piston, and drive means for said cylinder, said drive means being operable in a machining cycle for the workpiece for initially actuating said cylinder, said cylinder and the piston therein being movable together as a unit as a result of the fluid pressure exerted on the piston, said piston rod and said first clamping member thereby being actuated in the direction of said second clamping member with the workpiece therebetween until said first clamping member and said piston rod and piston have been stopped by engagement of said clamping members with said workpiece, and said drive means being thereafter further operable to impart an additional movement to said cylinder in the same direction to a final stop position and establish a constant clamping pressure on said workpiece as determined by the fluid pressure within said cylinder.

2. A device as claimed in claim 1 for clamping a workpiece wherein said drive means for said cylinder comprises a pair of pivotally interconnected arms establishing a toggle mechanism, one of said arms being connected to said cylinder and the other arm being connected to said second clamping member, and a driving cam engageable with a cam follower located at the pivotal connection between said arms for moving said arms in the direction to move said cylinder away from said second clamping member.

3. A device as defined in claim 2 for clamping a workpiece and which further includes a return spring connected to said toggle mechanism for moving the arms thereof in the opposite direction to return said cylinder towards said second clamping member.

4. A device as defined in claim 1 for clamping a workpiece and wherein said means for producing and maintaining a substantially constant pressure within said cylinder comprises a valve-controlled supply line for the pressure fluid and an outlet line from said cylinder containing a pressure relief valve for relieving any over-pressure.

5. A device as defined in claim 1 for clamping a workpiece wherein said first and second clamping members are interconnected by pivot means located at one side of said second clamping member, and said piston rod extends through a bore provided in said second clamping member to said piston and cylinder which are located at the opposite side of said second clamping member.

References Cited

UNITED STATES PATENTS 2,169,036   8/1939   Bidwell _____ 100—271
3,290,039   12/1966  Lancaster _____ 269—25

ROBERT C. RIORDON, *Primary Examiner.*

JAMES F. McKEOWN, *Assistant Examiner.*

U.S. Cl. X.R.

269—35, 154, 228